US008682331B2

(12) United States Patent
Nagaraja et al.

(10) Patent No.: US 8,682,331 B2
(45) Date of Patent: Mar. 25, 2014

(54) SYSTEM AND METHOD FOR INTERFERENCE BEACON TRANSMISSION

(75) Inventors: Sumeeth Nagaraja, San Diego, CA (US); Mehmet Yavuz, San Diego, CA (US); Farhad Meshkati, San Diego, CA (US); Christophe Chevallier, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 450 days.

(21) Appl. No.: 12/702,714

(22) Filed: Feb. 9, 2010

(65) Prior Publication Data

US 2010/0203892 A1    Aug. 12, 2010

Related U.S. Application Data

(60) Provisional application No. 61/151,478, filed on Feb. 10, 2009, provisional application No. 61/245,200, filed on Sep. 23, 2009, provisional application No. 61/262,093, filed on Nov. 17, 2009.

(51) Int. Cl.
*H04W 36/00* (2009.01)
*H04W 72/00* (2009.01)
*H04W 4/00* (2009.01)
*H04W 68/00* (2009.01)
*H04M 11/00* (2006.01)

(52) U.S. Cl.
USPC .......... 455/439; 455/444; 455/443; 455/454; 455/458; 455/422.1; 370/328; 370/331

(58) Field of Classification Search
USPC ......... 370/328, 331, 318; 455/437, 411, 458, 455/422.1, 404.1, 439, 444, 443, 454
See application file for complete search history.

(56) References Cited

U.S. PATENT DOCUMENTS

| 2002/0111166 | A1 | 8/2002 | Monroe |
| 2004/0058684 | A1* | 3/2004 | Charles ......................... 455/450 |
| 2005/0020240 | A1* | 1/2005 | Minter ........................ 455/404.1 |
| 2005/0075147 | A1* | 4/2005 | Fabien et al. ................. 455/574 |
| 2006/0089141 | A1 | 4/2006 | Ho et al. |
| 2007/0202891 | A1* | 8/2007 | Diachina et al. .............. 455/458 |

(Continued)

FOREIGN PATENT DOCUMENTS

| CN | 1476259 | 2/2004 |
| CN | 1565140 A | 1/2005 |

(Continued)

OTHER PUBLICATIONS

3GPP TS 36.304 v8.4.0, SG RAN Evolved Universal Terrestrial Radio Access (E-UTRA), User Equipment (UE) Procedures in Idle Mode, Release 8, Dec. 1, 2008, pp. 1-29.

(Continued)

*Primary Examiner* — Opiribo Georgewill

(57) ABSTRACT

Various systems and methods for interference beacon transmission are disclosed. In one embodiment, an apparatus for initiating cell reselection in a wireless communication device, such as a HNB, comprises a processor configured to determine a first frequency at which one or more wireless communication devices communicate with a first cell and a transceiver configured to transmit an interference beacon at the first frequency configured to at least partially interfere with communications at the first frequency and initiate a cell reselection process by at least one of the wireless communication devices.

33 Claims, 11 Drawing Sheets

(56) References Cited

U.S. PATENT DOCUMENTS

| | | | |
|---|---|---|---|
| 2009/0129336 A1* | 5/2009 | Osborn | 370/331 |
| 2009/0156165 A1* | 6/2009 | Raghothaman et al. | 455/411 |
| 2009/0238117 A1* | 9/2009 | Somasundaram et al. | 370/328 |
| 2010/0075658 A1* | 3/2010 | Hou et al. | 455/422.1 |

FOREIGN PATENT DOCUMENTS

| | | |
|---|---|---|
| CN | 1852554 A | 10/2006 |
| CN | 101217784 A | 7/2008 |
| CN | 101341678 A | 1/2009 |
| KR | 100846727 B1 | 7/2008 |
| WO | 04017581 | 2/2004 |
| WO | WO2007073269 A1 | 6/2007 |
| WO | 2008082481 A1 | 7/2008 |

OTHER PUBLICATIONS

International Search Report and Written Opinion—PCT/US2010/023785—International Search Authority—Jun. 10, 2010.
Nokia, et al: "Reselection Handling Towards Non-Allowed CSG Cell," 3GPP TSG RAN WG4 Meeting #48bis, R4-082447, Sep. 26, 2008. (3 pages).
Qualcomm Europe: "Measurement and Mobility Issues for Home (E)Node BS" 3GPP RAN WG2 #59bis, R2-074117, Oct. 2, 2007. (7 pages).
Vodafone Group: "Considerations for UTRA Home NB," 3GPP TSG RAN WG2 #63bis R2085701, Oct. 1, 2008. Paragraph 0002-0003 (pp. 1-6).
3GPP TS 25.211 V7.6.0 (2008-05). 3rd Generation Partnership Project; Technical Specification Group Radio Access Network: Physical channels and mapping of transport channels onto physical channels (FDD) (Release 7).
Balasubramanian S et al., "Femto Cells-Search and System Selection", 3GPP2,S00-FEMTO-20071015-024, Oct. 15, 2007.
Harikumar, G., "Femtocells: implementation challenges and solutions", 20031201, Dec. 1, 2003, pp. 1-30, XP007921140.
Motorola, Ericsson: "TR 25.820: TP for Deployment Configurations (5.2)", R4-080485, 3GPP TSG-RAN Working Group 4 (Radio) meeting #46, Feb. 15, 2008.
QUALCOMM Europe: "Restricted Association for HNBs", R2-075125, 3GPP TSG-RAN WG2 #59bis, Nov. 9, 2007.
QUALCOMM: "False Alarm on MICH", R2-040785, 3GPP TSG-RAN WG2 meeting #41bis, Apr. 22, 2004.
Samsung: "Open issues on DRX", R2-074261, 3GPP TSG-RAN2 Meeting #59bis, Oct. 12, 2007.
Taiwan Search Report—TW099104206—TIPO—Mar. 17, 2013.

* cited by examiner

US 8,682,331 B2

SYSTEM AND METHOD FOR INTERFERENCE BEACON TRANSMISSION

CROSS-REFERENCE TO RELATED APPLICATIONS

This application claims priority under 35 U.S.C. §119(e) of U.S. Provisional Patent App. Nos. 61/151,478, filed Feb. 10, 2009, 61/245,200, filed Sep. 23, 2009, and 61/262,093, filed Nov. 17, 2009, which are all hereby incorporated by reference in their entirety.

BACKGROUND

1. Field

The present disclosure relates to beacon transmission in a wireless communication network, and in particular to beacon transmission in a wireless communication network which causes a wireless communication device to reselect a beacon-transmitting cell.

2. Description of the Related Technology

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on one or more forward and reverse links. A forward link (or downlink) refers to the communication link from the base stations to the terminals, and a reverse link (or uplink) refers to the communication link from the terminals to the base stations. These communication links may be established by a single-input-single-output (SISO), multiple-input-single-output (MISO), or a multiple-input-multiple-output (MIMO) system.

To supplement conventional mobile phone network base stations, additional base stations may be deployed to provide more robust wireless coverage to mobile units. For example, wireless relay stations and small-coverage base stations (referred to as, e.g., access point base stations, Home NodeBs (HNBs), femto access points, or femto cells) may be deployed for incremental capacity growth, richer user experience, and in-building coverage. Typically, such small-coverage base stations are connected to the Internet and the mobile operator's network via DSL router or cable modem. As these other types of base stations may be added to the conventional mobile phone network (e.g., the backhaul) in a different manner than conventional base stations (e.g., macro base stations or Macro NodeBs (macro NBs)), there is a need for effective techniques for managing these other types of base stations and their associated user equipment.

SUMMARY

The systems, methods, apparatuses, and computer-readable mediums of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description" one of ordinary skill in the art will appreciate how the features of this invention provide for interference beacon transmission and initiation of cell reselection.

In one embodiment, a first base station is configured to transmit one or more interference beacons which reduce the measured signal quality of a communication link between a wireless communication device and a second base station such that the wireless communication device initiates a cell search and reselection procedure, thereby discovering and reselecting the first base station.

One aspect is a method of initiating cell reselection in a wireless communication device, the method comprising determining a first frequency at which a one or more wireless communication devices communicate with a first cell, and transmitting an interference beacon at the first frequency configured to at least partially interfere with communications at the first frequency and initiate a cell reselection process by at least one of the wireless communication devices.

In one embodiment, the method further comprises communicating with the at least one of the wireless communication device at a second frequency different from the first frequency.

In one embodiment, the method further comprises determining a first wake-up time of the at least one of the wireless communication devices, wherein the beacon is transmitted during the determined first wake-up time. The wake-up time may be determined based at least in part on a SFN (System Frame Number) of the first cell and an IMSI (International Mobile Subscriber Identity) of the at least one of the wireless communication devices.

In one embodiment, the method further comprises determining a plurality of potential wake-up times of the at least one of the wireless communication devices, wherein the beacon is transmitted during one of the plurality of potential wake-up times, and transmitting a plurality of additional interference beacons at the first frequency during the other determined potential wake-up times. The potential wake-up times may be determined based at least in part on a SFN (System Frame Number) of the first cell.

Another aspect is an apparatus for initiating cell reselection in a wireless communication device, the apparatus comprising a processor configured to determine a first frequency at which one or more wireless communication devices communicate with a first cell, and a transceiver configured to transmit an interference beacon at the first frequency configured to at least partially interfere with communications at the first frequency and initiate a cell reselection process by at least one of the wireless communication devices.

Another aspect is a computer program product comprising a computer readable medium further comprising code for determining a first frequency at which one or more wireless communication devices communicate with a first cell, and code for transmitting an interference beacon at the first frequency configured to at least partially interfere with communications at the first frequency and initiate a cell reselection process by at least one of the wireless communication devices.

Another aspect is an apparatus for initiating cell reselection in a wireless communication device, the apparatus comprising means for determining a first frequency at which one or more wireless communication devices communicate with a first cell, and means for transmitting an interference beacon at the first frequency configured to at least partially interfere with communications at the first frequency and initiate a cell reselection process by at least one of the wireless communication devices.

Figure 1:
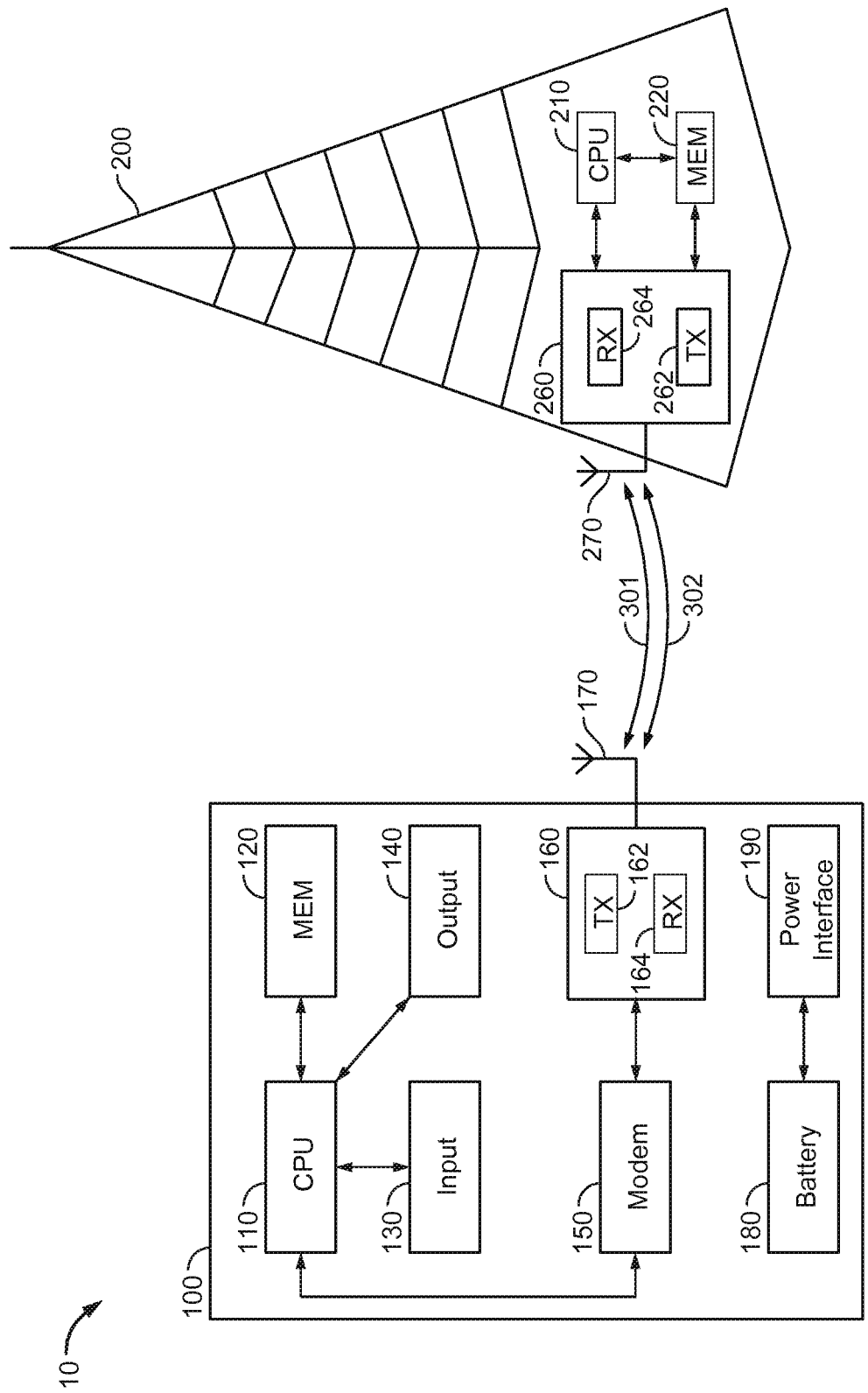
FIG. 1 is a functional block diagram of a wireless communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

The following detailed description is directed to certain specific aspects. However, aspects can be embodied in a multitude of different ways, for example, as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Similarly, methods disclosed herein may performed by one or more computer processors configured to execute instructions retrieved from a computer readable storage medium stored as code. A computer readable storage medium stores information, such as data or instructions, for some interval of time, such that the information can be read by a computer during that interval of time. Examples of computer readable storage media are memory, such as random access memory (RAM), and storage, such as hard drives, optical discs, flash memory, floppy disks, magnetic tape, paper tape, punch cards, and Zip drives.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards, and others, are known in the art.

Single carrier frequency division multiple access (SC-FDMA), which utilizes single carrier modulation and frequency domain equalization is a multiple access technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Referring to FIG. 1, one embodiment of a wireless communication system 10 includes at least one user equipment (UE) 100 and at least one base station 200 communicating with each other over a first communication link (or carrier) 301 and a second communication link (or carrier) 302. Each of the first and second carriers 301, 302 can be an uplink carrier, a downlink carrier, or an uplink/downlink carrier. Further, each of the first and second carriers 301, 302 may be either in an active state, in which data is transmitted via the carrier, or in an inactive state, in which data is not transmitted via the carrier.

The user equipment 100 includes a processor ("CPU") 110 in data communication with a memory 120, an input device 130, and an output device 140. The processor 110 is further in data communication with a modem 150 and a transceiver 160. The transceiver 160 is also in data communication with the modem 150 and an antenna 170. The user equipment 100 and components thereof are powered by a battery 180 and/or an external power source. In some embodiments, the battery 180, or a portion thereof, is rechargeable by an external power source via a power interface 190. Although described separately, it is to be appreciated that functional blocks described with respect to the user equipment 100 need not be separate structural elements. For example, the processor 110 and memory 120 may be embodied in a single chip. Similarly, two or more of the processor 110, modem 150, and transceiver 160 may be embodied in a single chip.

The processor 110 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor 110 may also be implemented as a combination of computing devices, e.g., a combination of a DSP and a microprocessor, a plurality of microprocessors, one or more microprocessors in conjunction with a DSP core, or any other such configuration.

The processor 110 can be coupled, via one or more buses, to read information from or write information to the memory 120. The processor may additionally, or in the alternative, contain memory, such as processor registers. The memory 120 can include processor cache, including a multi-level hierarchical cache in which different levels have different capacities and access speeds. The memory 120 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 110 is also coupled to an input device 130 and an output device 140 for, respectively, receiving input from and providing output to, a user of the user equipment 100. Suitable input devices include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, and haptic output devices, including force-feedback game controllers and vibrating devices.

The processor 110 is further coupled to a modem 150 and a transceiver 160. The modem 150 and transceiver 160 prepare data generated by the processor 110 for wireless transmission over the carriers 301, 302 via the antenna 170 according to one or more air interface standards. The modem 150 and transceiver 160 also demodulate data received over the carriers 301, 302 via the antenna 170 according to one or more air interface standards. The transceiver can include a transmitter 162, a receiver 164, or both. In other embodiments, the transmitter 162 and receiver 164 are two separate components. The modem 150 and transceiver 160, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. The antenna 170 can include multiple antennas for multiple-input/ multiple-output (MIMO) communication.

The user equipment 100 and components thereof are powered by a battery 180 and/or an external power source. The battery 180 can be any device which stores energy, and particularly any device which stores chemical energy and provides it as electrical energy. The battery 180 can include one or more secondary cells including a lithium polymer battery, a lithium ion battery, a nickel-metal hydride battery, or a nickel cadmium battery, or one or more primary cells including an alkaline battery, a lithium battery, a silver oxide battery, or a zinc carbon battery. The external power source can include a wall socket, a vehicular cigar lighter receptacle, a wireless energy transfer platform, or the sun.

In some embodiments, the battery 180, or a portion thereof, is rechargeable by an external power source via a power interface 190. The power interface 190 can include a jack for connecting a battery charger, an inductor for near field wireless energy transfer, or a photovoltaic panel for converting solar energy into electrical energy.

In some embodiments, the user equipment 100 is, for example, but not limited to a mobile telephone, a personal data assistant (PDAs), a hand-held computer, a laptop computer, a tablet, a wireless data access card, a GPS receiver/ navigator, a camera, an MP3 player, a camcorder, a game console, a wrist watch, a clock, or a television.

The base station 200 also includes at least a processor ("CPU") 210 coupled to a memory 220 and a transceiver 260. The transceiver 260 includes a transmitter 262 and a receiver 264 coupled to an antenna 270. The processor 210, memory 220, transceiver 260, and antenna 270 can be embodied as described above with respect to the user equipment 100.

Figure 2:
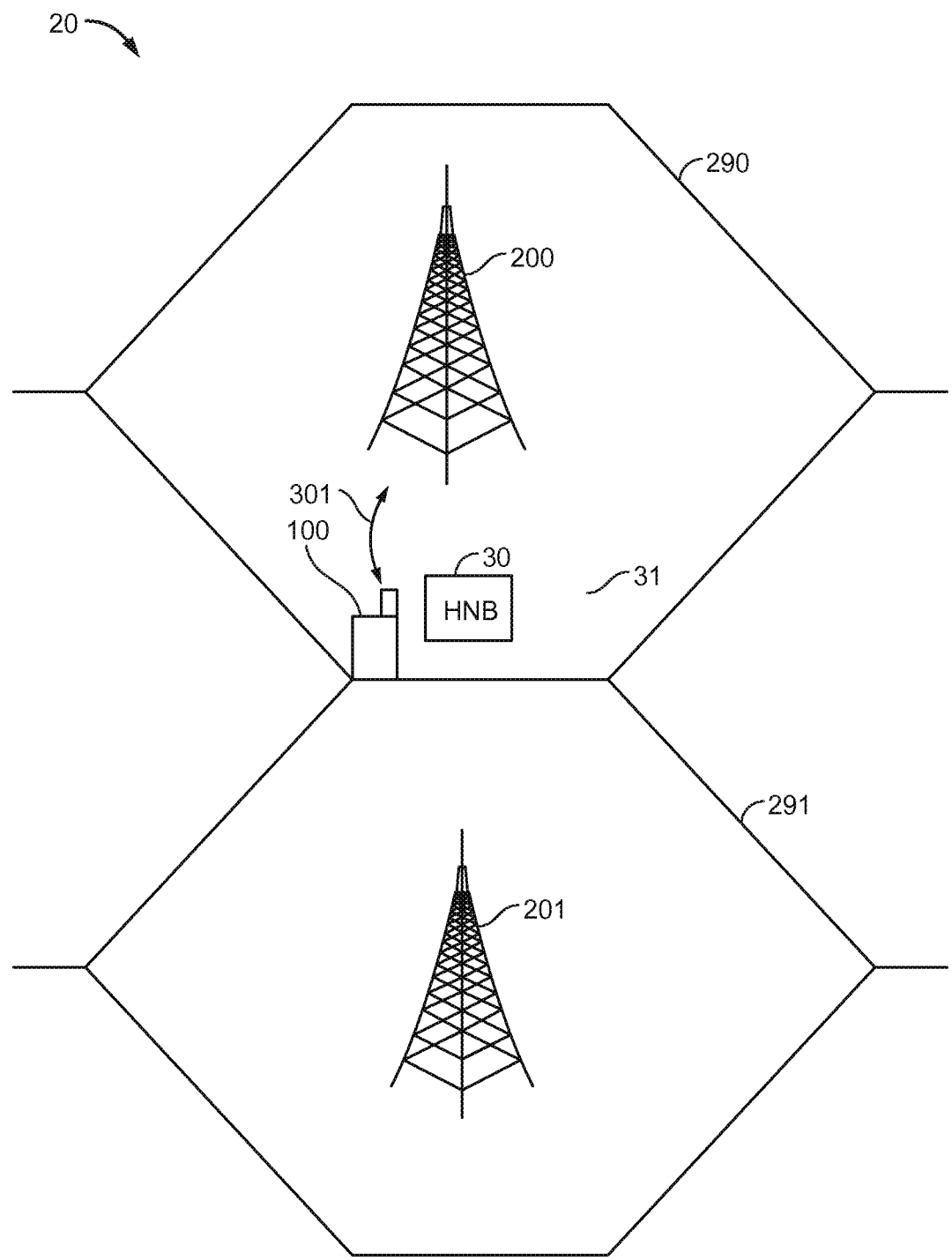
FIG. 2 is a diagram of a portion of a cellular network.

Referring to FIG. 2, one embodiment of a cellular network 20 includes at least a first base station 200 having a first coverage area 290 and a second base station 201 having a second coverage area 291. In FIG. 2, the user equipment 100 is located near the border of the first coverage area 290 and the second coverage area 291. Thus, in some cases, the wireless coverage at that location is weak, or not robust. However, the user equipment 100 is also located near a third base station 30 having a third coverage area 31. In one embodiment, the first base station 200 and the second base station 201 are macro base stations, such as a Macro NodeBs, and the third base station 30 is a small-coverage base station, such as a Home NodeB. The third base station 30 may include the elements described with respect to the first base station 200, including a processor 210, memory 220 and transceiver 260.

In a UTRAN/UMTS network, a user equipment (UE) may be in idle mode camping on a Macro NodeB (MNB) when it approaches a Home NodeB (HNB) upon which stronger or more robust coverage would be received. The process of switching from the MNB to the HNB is called HNB discovery. In some embodiments, multiple frequencies are available in the network. In one embodiment, a UE may be camping on a MNB at a first frequency and the HNB may operate at a second frequency. If the UE is in reasonably good macro coverage, for example, if the MNB signal quality is above a threshold required to trigger searches and reselection, the UE will remain camping on the MNB and may never discover the potentially more desirable HNB.

Described herein are systems and methods based on beacon transmission to address the HNB discovery issue. In one embodiment, a HNB transmits beacons on all macro-frequencies. In another embodiment, the HNB transmits on only one frequency or transmits on many frequencies, but not all macro frequencies. In one embodiment, beacon transmission by a HNB triggers the search and reselection procedure at the UE and thereby facilitates the discovery of the HNB. In another embodiment, the beacons carry information that enable UEs to discover the HNB on frequencies other than that at which the beacon is transmitted.

While beacon transmission on frequencies at which a UE communicates with a macro NB may at least partially address the HNB discovery issue, it may also cause unwanted interference to UEs that are in an active call via the macro NB. Beacons may be designed to address fast HNB discovery while achieving minimal or no unwanted interference to UEs. Beacon designs that address the HNB discovery and interference issues are described herein. Furthermore, other interference management techniques that mitigate interference to non-allowed UEs are described.

Figure 3:
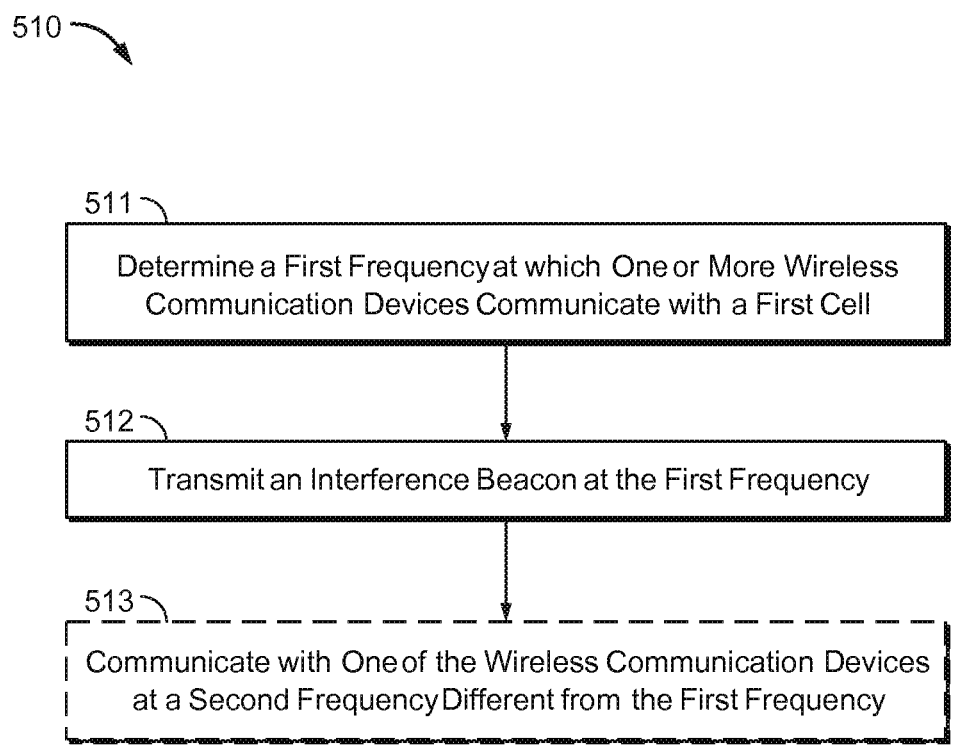
FIG. 3 is a flowchart illustrating a method of beacon transmission.

Referring to FIG. 3, one embodiment of a method 510 of beacon transmission is described. The method 510 could be performed, for example, by the HNB 30 of FIG. 2. The method 510 begins, in block 511, with the determination of at least a first frequency at which one or more wireless communication devices communicate with a first cell. The determination can be performed, for example, by the processor 210, potentially in conjunction with the memory 220. For example, in one embodiment, the HNB 30 of FIG. 2 determines the macro frequencies at which UEs are communicating with a macro NB. The determination may be performed, for example, by measuring the frequency of ongoing communications, such as when the UE reacquires the macro NB. The determination may also be performed by accessing one or more frequencies stored in a memory. In one embodiment, more than one frequency is determined. In one embodiment, all macro frequencies are determined.

In another embodiment, the method 510 begin, in block 511, with the determination of a first frequency designated for communication over a communication network which is not designated for communication with a particular cell. For example, in one embodiment, the HNB 30 determines frequencies designated for communication over the cellular network 20 which are not designated for communication with the HNB 30. Thus, determination of a frequency at which one or more wireless communication devices communicate with a first cell can be performed passively, without requiring measurement or explicit knowledge of communication with the first cell.

Next, the method 510 continues to block 512 in which an interference beacon is transmitted at the first frequency. The transmission can be performed, for example, by the transceiver 260 over one or more antennas 270. As mentioned above, in one embodiment, more than one frequency is determined. In such an embodiment, an interference beacon may be transmitted at each of the determined frequencies. Similarly, in one embodiment, all macro frequencies are determined and an interference beacon is transmitted at each macro frequency. The interference beacons can be transmitted at multiple frequencies simultaneously, overlapping in time, or at different times.

In one embodiment, the interference beacon is transmitted such that the signal quality measured by the wireless communication device is less than a predetermined threshold. In one embodiment, the interference beacon is of a duration approximately equal to the expected time for the wireless communication device to reacquire the first cell.

In one embodiment, an interference beacon comprises one or more UMTS (Universal Mobile Telecommunications System) overhead channels such as P-SCH (Primary Synchronization Channel), S-SCH (Secondary Synchronization Channel), PCCPCH (Primary Common Control Physical Channel), BCCH (Broadcast Control Channel), PICH (Paging Indicator Channel), PCH (Paging Channel), and PC-PICH (Primary Common Pilot Channel). A few PSCs (Primary Synchronization Codes) may or may not be reserved for the beacon transmission. Since the beacon transmission on a macro frequency may involve an actual PSC and is referred to herein as a HNB-Beacon. A UE 30 receiving the HNB-Beacon may erroneously believe that it represents a cell for communication at the frequency at which the beacon was transmitted. Because the HNB 30 is not configured for communication at the frequency at which the beacon was transmitted, this is referred to as an imaginary cell. Such an imaginary cell is distinct from the HNB 30 itself, which is configured for communication at a different frequency.

In one embodiment, the HNB-Beacon has cell access restriction status set to cell barred/reserved/reserved for future-user status. Furthermore, in one embodiment, the intra-frequency cell reselection indicator (where applicable) is set to 'allowed.'

In most cases, performance of the steps described with respect to block 511 and 512 will at least trigger a wireless communication device to perform a cell search procedure as described below with respect to FIG. 4. In some embodiments, it may trigger the wireless communication device to perform a cell reselection procedure. In other embodiments, transmission of an additional beacon (or a repetition of block 512) may be performed to trigger a cell reselection procedure.

Figure 4:
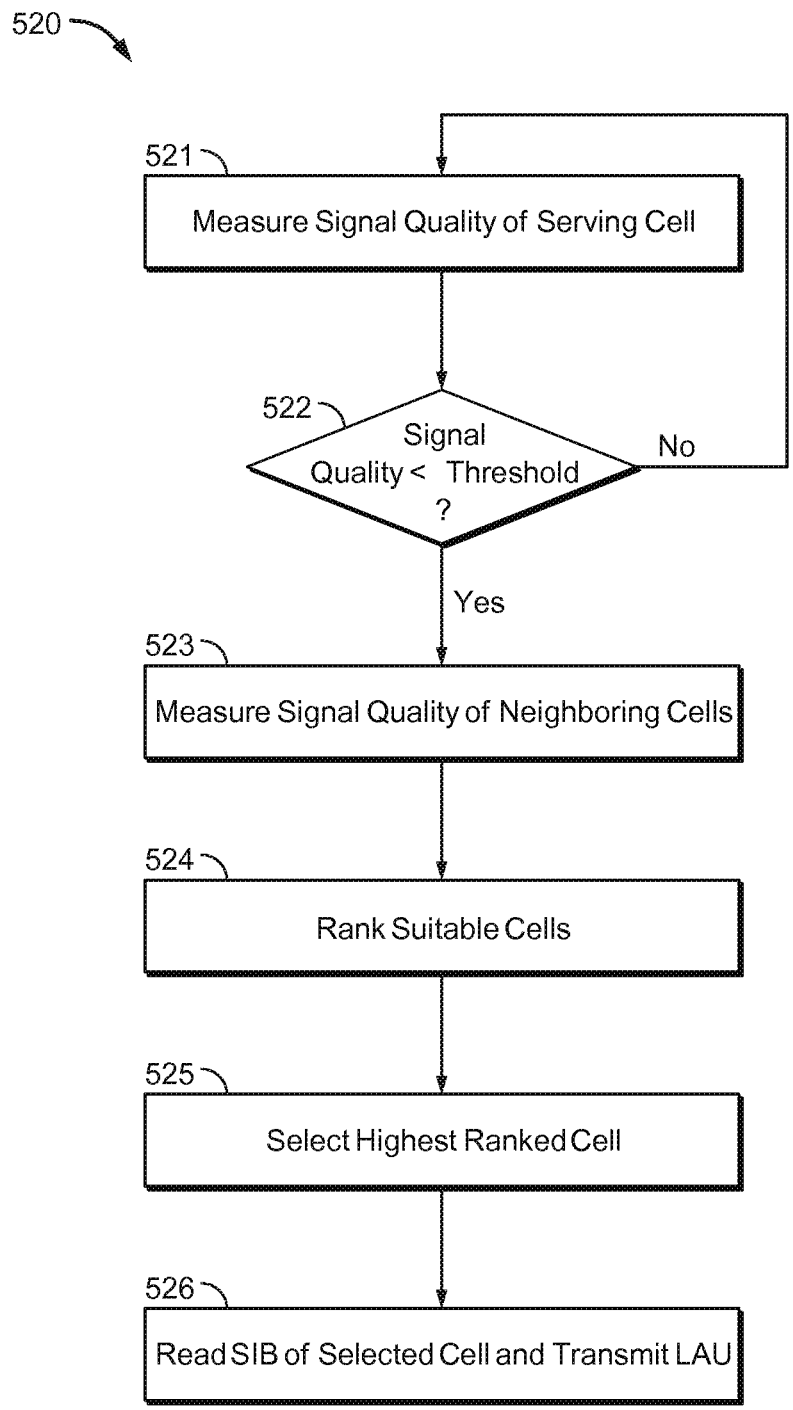
FIG. 4 is a flowchart illustrating a method of cell reselection.

Referring to FIG. 4, a method 520 of cell reselection is described. The method 520 is described below three times. First, the method 520 is described generally as may be performed, for example, by the UE 100 while camping on a base station 200. Second, the method 520 is described as may be performed, for example, by the UE 100 while camping on a base 200, while in the vicinity of a HNB 30. Finally, the method 520 is described as may be performed, for example, by a CSG (Closed System Group) enable or CSG aware UE 100.

In one embodiment, the process 520 is performed periodically, such as every DRX (Discontinuous Reception) cycle. The process 520 begins, in block 521, with the UE 100 measuring a signal quality of the base station 200. In one embodiment, the measured signal quality is the CPICH (Common Pilot Channel) Ec/No. In one embodiment, the measured signal quality is the ratio of the received pilot energy to the total received spectral density of the macro NB. In another embodiment, the measured signal quality is the RSCP (Received Signal Code Power).

Next, in block 522, the UE 100 determines if the signal quality is less than a predetermined threshold. In one embodiment, the signal quality is compared to an intra-frequency threshold and an inter-frequency threshold. In one embodiment, it is determined that the signal quality is less than a predetermined threshold if Squal<Sintrasearch or Squal<Sintersearch, wherein Squal=Qqualmeas−Qqualmin is the quality requirement of the current serving cell, Sintrasearch is the intra-frequency threshold, Sintersearch is the inter-frequency threshold, Qqualmeas is the signal quality measured in block 310, and Qqualmin is a minimum required signal quality.

If it is determined that the signal quality is not less than a predetermined threshold, the process 520 ends or returns to block 521 at the next DRX cycle. If it is determined that the signal quality is less than a predetermined threshold, the process 520 continues to block 523 where the UE 100 measures the signal quality of neighboring cells. In one embodiment, the UE 100 also checks each cell for suitability. In one embodiment, a neighboring cell is suitable if the measured signal quality of the neighboring cell is greater than Qqualmin+Pcompensation. In one embodiment, Pcompensation is set to zero. In other embodiments, Pcompensation is a positive or negative number.

The process 520 continues to block 524 in which the cells are ranked. In one embodiment, the cells are ranked according to their measured signal quality. In another embodiment, the cells are ranked according to a cost function which may or may not include the measured signal quality as an argument. The cells may be stored in a list in the memory 120 of UE 100 of FIG. 1 and sorted according to any of a number of sorting methods known to those of skill in the art.

Continuing, in block 525, the highest ranking cell is selected. In one embodiment, the UE 100 checks if the highest ranked cell is better than the serving cell for a time interval of Treselection. The highest ranked neighboring cell may be determined to be better than the serving cell if the measured signal quality of the neighboring cell is higher than the measured signal quality of the serving cell.

The process 520 continues to block 526 in which the UE 100 reads the SIBs (system information blocks) of the highest ranked cell and checks the suitability criteria for camping, as determined by reading the SIB of the highest ranked cell. In one embodiment, the UE 100 transmits a Location Area Update (LAU) message to the newly selected cell if the location area of the new cell is different from the previously serving cell.

A "location area" is a set of base stations that are grouped together to improve or optimize signaling. Tens or hundreds of base stations share a single controller, termed a Base Station Controller (BSC) in GSM and termed a Radio Network Controller (RNC) in UMTS. In one embodiment, the controller handles allocation of radio channels, receives measurements from the UEs, and controls handovers from base station to base station. Each location area is associated with a unique number called a "location area code" (LAC). In one embodiment, the LAC is broadcast by the Node B at regular intervals. The location update procedure allows a mobile device to inform the cellular network, whenever it moves from one location area to the next.

On receiving a LAU accept message indicative of an acceptance of the LAU message, the procedure continues with via the newly selected cell. On the other hand, on receiving a LAU reject message indicative of a rejection of the LAU, the UE 100 performs the following: a) The UE 100 adds the Location Area Code (LAC) of the new cell to a list of forbidden LACs; b) the UE 100 sets an internal status to 'roaming not allowed'; and c) stored information cell selection is performed to find a suitable cell. In the next DRX cycle, if the highest ranked cell is on the UE's list of forbidden LACs the frequency may be banned for up to 300 seconds.

Although the method 520 of FIG. 4 has been generally described above, the results of performing the method 520 may change depending on the vicinity and signal power of nearby cells. In one embodiment, illustrated in FIG. 2, a UE 100 is camped on a base station 200, but it is more desirable that the UE 100 connect to the network via a different cell, such as the third base station (HNB) 30. If the HNB 30 transmits one or more beacons according to FIG. 3, the results of FIG. 4 will likely be that the UE 100 reselects the HNB 30 as described below.

If the UE 100 is in the vicinity of a UE, the process 520 begins, in block 521, as above, with the UE 100 measuring signal quality of the base station 200. As mentioned above, in one embodiment, the measured signal quality is the CPICH (Common Pilot Channel) Ec/No. In one embodiment, the measured signal quality is the ratio of the received pilot energy to the total received spectral density of the macro NB 200. In another embodiment, the measured signal quality is the RSCP (Received Signal Code Power).

Next, in block 522, the UE 100 determines if the signal quality is less than a predetermined threshold. In one embodiment, the signal quality is compared to an intra-frequency threshold and an inter-frequency threshold. In one embodiment, it is determined that the signal quality is less than a predetermined threshold if Squal<Sintrasearch or Squal<Sintersearch.

Because the HNB 30 is transmitting an interference beacon at one or more frequencies at which the UE 100 is communicating with the base station 200, it is likely that the signal quality of the macro NB 200 will be degraded, the measured signal quality of the macro NB will be below the predetermined threshold, and the method 520 will continue to block 523. In one embodiment, if the measured signal quality is less than Sintersearch a cell search procedure is performed. If the measured signal quality is less than Sintrasearch, the UE 100 reads the overhead messages from the HNB-Beacon and, because the cell restriction access IE (information element) is set to 'barred', the UE 100 bars the HNB-Beacon for a duration of Tbarred. This prevents the UE 100 from attempting to reselect the imaginary cell represented by the HNB-Beacon.

Next, in block 523, the UE 100 measures the signal quality of neighboring cells. In one embodiment, the UE 100 also checks each cell for suitability. In one embodiment, a neighboring cell is suitable if the measured signal quality of the neighboring cell is greater than Qqualmin+Pcompensation.

The process 520 continues to block 524 in which the cells (except for the imaginary cell represented by the HNB-Beacon, as it is 'barred') are ranked. In one embodiment, the cells are ranked according to their measured signal quality. In another embodiment, the cells are ranked according to a cost function which may or may not include the measured signal quality as an argument. For example, in one embodiment, the ranking metric for the serving cell is the measured signal quality plus a hysteresis offset, whereas the ranking metric for neighboring cells is the measured signal quality minus a switching offset. The hysteresis offset and switching offset for each neighboring cell may be sent on the downlink of the serving cell. In one embodiment, these parameters are biased so as to promote switching to HNBs.

Continuing, in block 525, the highest ranking cell is selected. In one embodiment, the UE 100 checks if the highest ranked cell is better than the serving cell for a time interval of Treselection. The highest ranked neighboring cell may be determined to be better than the serving cell if the measured signal quality of the neighboring cell is higher than the measured signal quality of the serving cell. Because the UE 100 is in the vicinity of a HNB 30, the HNB 30 will likely be the highest ranked cell.

The process 520 continues to block 526 in which the UE 100 reads the SIBs (system information blocks) of the HNB 30 and checks the suitability criteria for camping, as determined by reading the SIB of the HNB 30. In one embodiment, the UE 100 transmits a LAU message to the HNB 30 if the location area of the HNB 30 is different from the previously serving cell.

On receiving a LAU accept message indicative of an acceptance of the LAU, the LAU procedure continues with via the HNB 30. On the other hand, on receiving a LAU reject message indicative of a rejection of the LAU, which may occur because the UE 100 is not authorized to camp on the HNB 30, the UE 100 performs the following: a) The UE 100 adds the Location Area Code (LAC) of the HNB 30 to a list of forbidden LACs; b) the UE 100 sets an internal status to 'roaming not allowed'; and c) stored information cell selection is performed to find a suitable cell. In the next DRX cycle, if the HNB 30 is on the UE's list of forbidden LACs the frequency may be banned for up to 300 seconds.

As mentioned above, the results of performing the method 520 of FIG. 4 may change depending on the vicinity and signal power of nearby cells. Further, the results may change depending on whether the UE 100 is CSG (Closed Subscriber Group) capable or CSG aware. In one embodiment, illustrated in FIG. 2, a UE 100 is camped on a base station 200, but it is more desirable that the UE 100 connect to the network via a different cell, such as the third base station (HNB) 30. If the HNB 30 transmits one or more beacons according to FIG. 3 in which the HNB-Beacon has the same cell identity as the HNB 30, the results of FIG. 4 will likely be that the UE 100 reselects the HNB 30 as described below.

If a CSG aware UE 100 is in the vicinity of a UE 100, the process 520 begins, in block 521, as above, with the UE 100 measuring signal quality of the base station 200. As mentioned above, in one embodiment, the measured signal quality is the CPICH (Common Pilot Channel) Ec/No. In one embodiment, the measured signal quality is the ratio of the received pilot energy to the total received spectral density of the macro NB. In another embodiment, the measured signal quality is the RSCP (Received Signal Code Power).

Next, in block 522, the UE 100 determines if the signal quality is less than a predetermined threshold. In one embodiment, the signal quality is compared to an intra-frequency threshold and an inter-frequency threshold. In one embodiment, it is determined that the signal quality is less than a predetermined threshold if Squal<Sintrasearch or Squal<Sintersearch.

Because the HNB 30 is transmitting an interference beacon at one or more frequencies at which the UE 100 is communicating with the base station 200, it is likely that the signal quality of the macro NB 200 will be degraded, the measured signal quality of the macro NB 200 will be below the predetermined threshold, and the method 520 will continue to block 523. In one embodiment, if the measured signal quality is less than Sintersearch or Sintrasearch, a cell search procedure is performed.

Next, in block 523, the UE 100 measures the signal quality of neighboring cells. In one embodiment, the UE 100 also checks each cell for suitability. In one embodiment, a neighboring cell is suitable if the measured signal quality of the neighboring cell is greater than Qqualmin+Pcompensation.

The process 520 continues to block 524 in which the cells (including the imaginary cell associated with the HNB-Beacon having the same cell identity as the HNB 30) are ranked. In one embodiment, the cells are ranked according to their measured signal quality. In another embodiment, the cells are ranked according to a cost function which may or may not include the measured signal quality as an argument. For example, in one embodiment, the ranking metric for the serving cell is the measured signal quality plus a hysteresis offset, whereas the ranking metric for neighboring cells is the measured signal quality minus a switching offset. The hysteresis offset and switching offset for each neighboring cell may be sent on the downlink of the serving cell. In one embodiment, these parameters are biased so as to promote switching to HNBs.

Continuing, in block 525, the highest ranking cell is selected. In one embodiment, the UE 100 checks if the highest ranked cell is better than the serving cell for a time interval of Treselection. The highest ranked neighboring cell may be determined to be better than the serving cell if the measured signal quality of the neighboring cell is higher than the measured signal quality of the serving cell. Because the UE 100 is in the vicinity of a HNB 30, the HNB 30 or the HNB-Beacon will likely by the highest ranked cell.

In the case an inter-frequency search is triggered, the process 520 continues to block 526 in which the UE 100 reads the SIBs (system information blocks) of the HNB 30 and checks the suitability criteria for camping, as determined by reading the SIB of the HNB 30. If the UE 100 is not allowed on the HNB 30, in one embodiment, the UE 100 aborts the reselection procedure, returning to block 521, and continues camping on the serving cell. If the UE 100 is allowed on the HNB 30, the UE 100 transmits a LAU message to the HNB 30 if the location area of the HNB 30 is different from the previously serving cell. On receiving a LAU accept message indicative of an acceptance of the LAU, the LAU procedure continues with via the HNB 30.

In the case an inter-frequency search is not triggered, but an intra-frequency search has been triggered, the UE 100 reads the SIB of the HNB-Beacon. In one embodiment, the HNB-Beacon cell access restriction is set to 'reserved for future use' and the CSG reservation information bit is set to 'true.' Accordingly, upon obtaining the cell access status and CSG reservation information bit, the UE 100 will behave as though the HNB-Beacon cell status is indicated as 'not reserved.' Thus, the UE 100 checks the suitability criteria for camping on the imaginary cell associated with the HNB-Beacon (having the same cell identity as the HNB 30) as read from the SIBs of the HNB-Beacon. In one embodiment, the UE 100 also performs access control to determine if the UE 100 is in a white-list.

If the UE 100 is not allowed on the HNB 30, the UE 100 returns to block 521. If the UE is allowed on the HNB 30, the UE 100 reselects the imaginary cell associated with HNB-Beacon, but does not transmit a LAU message because the LAI (Location Area Identifier) is the same as that of the previously serving macro NB. The UE 100 alters Sintersearch, Qqualmin, the hysteresis offset, and the reselection offsets set that i) the UE 100 performs an inter-frequency search every DRX cycle, and ii) the cell ranking is biased toward the HNB 30 on an different frequency. Thus, returning to block 521, in the next DRX cycle it is likely that the UE 100 will reselect the HNB 30, transmit a LAU message to the HNB 30, and upon receiving a LAU accept message indicative of an acceptance of the LAU, continue the LAU procedure with the HNB 30.

As described above, in one embodiment, beacons are transmitted by cells to trigger search and reselection procedures by nearby wireless communication devices. In one embodiment, HNBs transmit beacons on a number of frequencies used by nearby macro NBs. When a UE, camping on a macro NB (on one of $f_2, f_3, \ldots, f_n$) approaches a HNB (on $f_1$), the beacons (at $f_2, f_3, \ldots, f_n$) will cause interference and degradation of the signal quality of the macro NB as measured by the UE. When the measured signal quality of the serving macro NB falls below a predetermined threshold, such as the Sintersearch threshold or Sintrasearch threshold, the UE begins cell search and reselection procedures.

Whereas beacon transmission on the frequencies used by nearby macro NBs can be used to address the HNB discovery issue, the beacons may cause interference to nearby non-allowed UEs that are in an active call on the network served by the macro NB. The interference may cause downlink voice artifacts, radio link failure (RLF), macro capacity impact, or other problems. A careful design of beacons is therefore desirable in order to enable quick HNB discovery while achieving minimal or no interference to nearby non-allowed UEs.

Accordingly, a preferred beacon design minimizes HNB discovery time and minimizes the interference caused to nearby non-allowed UEs. Various embodiments of beacon designs are described below along with their performance in terms of UE discovery time and interference at non-allowed UEs.

In one embodiment, a beacon comprises standard UMTS overhead channels. In particular, a beacon may comprise one or more of PSCH (Primary Synchronization Channel), SSCH (Secondary Synchronization Channel), P-CPICH (Primary Common Pilot Channel), S-CPICH (Secondary Common Pilot Channel), PCCPCH (Primary Common Control Physical Channel), SCCPCH (Secondary Common Control Physical Channel), and PICH (Paging Indicator Channel). A separate PSC (Primary Synchronization Code) may or may not be allocated by P-CPICH.

In one embodiment, beacons are transmitted on multiple frequencies. Accordingly, beacons may or may not be transmitted simultaneous on multiple frequencies. In one embodiment, beacons are not transmitted simultaneous on multiple frequencies, but in a time-staggered, frequency hopping, fashion. For example, a beacon may be transmitted at a first frequency for a first time and a second frequency for a second, non-overlapping, time.

The duration of beacons is a variable which can be set and controlled. At times, beacons may not be transmitted in order to avoid unwanted interference with nearby non-allowed UEs.

The power of beacons is also a variable which can be set and controlled. Beacon power can be set such that adequate coverage is provided to trigger reselection at allowed UEs while causing minimal interference at non-allowed UEs. As noted above, at times, beacon transmission may be temporarily stopped to protect a nearby UE in an active call from unwanted interference.

An example of beacon generation at multiple frequencies is described below. In the below example, $N_{freq}$ is the number of frequencies on which beacons are transmitted, $P_f$ is the power level of DL overhead channel HNB P-CPICH, on the HNB operating frequency, in units of dB, $\Delta i$, for i=1, 2, ..., k, are the k different power level offsets relative to the HNB P-CPICH power level on the HNB operating frequency such that each beacon is transmitted with one of k power levels $P_f+\Delta i$, for i=1, 2, ..., k, and $BTD_i$, for i=1, 2, ..., k, are the durations of beacon transmissions on a certain frequency when transmitting at a power level offset $\Delta i$.

Figure 5:
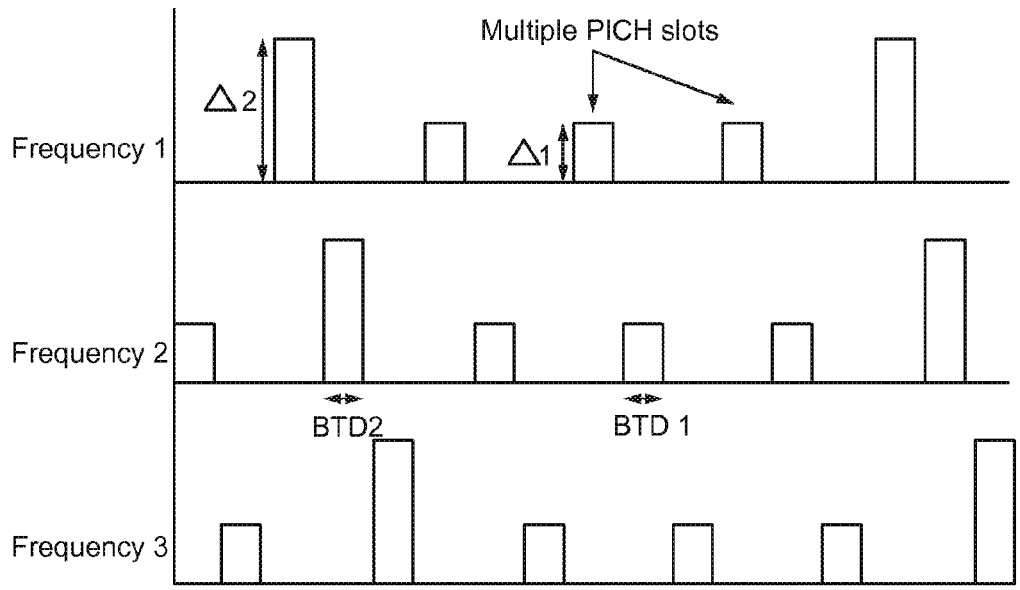
FIG. 5 is a plot of beacon transmission over time at multiple frequencies.

Referring to FIG. 5, a plot of beacon transmission over time and multiple frequencies illustrates the usage of the above-described variables. As shown in FIG. 5, the beacon power and duration may vary over time, including high-power levels and low-power levels, and across frequency. Furthermore, PSCs used for beacon transmission may also may across frequency and time.

In particular, FIG. 5 illustrates a first beacon being transmitted at Frequency 1 having a power level of $\Delta 2$, as well as a number of subsequent beacons having a power level of $\Delta 1$. At Frequency 2, a number of beacons are transmitted, including a beacon having a duration of $BTD_2$ and a beacon having a duration of $BTD_1$. FIG. 5 also illustrates an example of beacon transmission where beacons are not radiated simultaneously at multiple frequencies. In particular, FIG. 5 the beacons transmitted at Frequency 1 are transmitted at different times from those transmitted at Frequency 2.

In addition to varying the above described variables, beacon transmission can also be influenced by additional knowledge of other parameters such as IMSIs (International Mobile Subscriber Identities) of nearby UEs or SFNs (Cell System Frame Numbers) of nearby macro NBs. Unique identifiers besides IMSIs or SFNs could also be used.

Based on the variables described above, a number of beacon transmission patterns are feasible. A few examples are discussed below, but it is to be appreciated that the examples are not exhaustive and that other transmission patterns can also be derived.

In a UMTS (Universal Mobile Telecommunications System) cellular network, a UE wakes up every DRX (Discontinuous Reception) cycle and measures the signal quality of the serving macro NB. In one embodiment, the CPICH Ec/No is measured, the ratio of the received pilot energy to the total received power spectral density at the UE. In addition to measuring the signal quality of the serving cell, the UE reads the paging indicators (PIs) sent on the paging indicator channel (PICH) of the serving macro NB. In between these wake-ups, a UE is placed in a power-saving mode.

The UE wake-up for reacquiring the serving macro is dependent on the timing of the paging indicators (PIs) send via the paging indicator channel (PICH). The UE wake-up for reading the PI from the serving NB is given by the following equations:

$$PI\ Value = (IMSI\ div\ 8192) \bmod N_p; \text{ and}$$

$$q = \left( PI\ \text{Value} + \left\lfloor \left( \left( 18 \times \left\lfloor \begin{array}{c} SFN + \lfloor SFN/8 \rfloor + \\ SFN/64 \rfloor + \lfloor SFN/512 \rfloor \end{array} \right\rfloor \right) \bmod 144 \right) \times \frac{N_p}{144} \right\rfloor \right)$$
$$\bmod N_p$$

In the above equation, $N_p$ (the number of sub-frames) is one of 18, 36, 72, or 144. The length of the sub-frame is inversely proportional to $N_p$. It will be appreciated that q can only take values between 0 and $N_p-1$, and is a function of SFN, IMSI and $N_p$.

Figure 6:
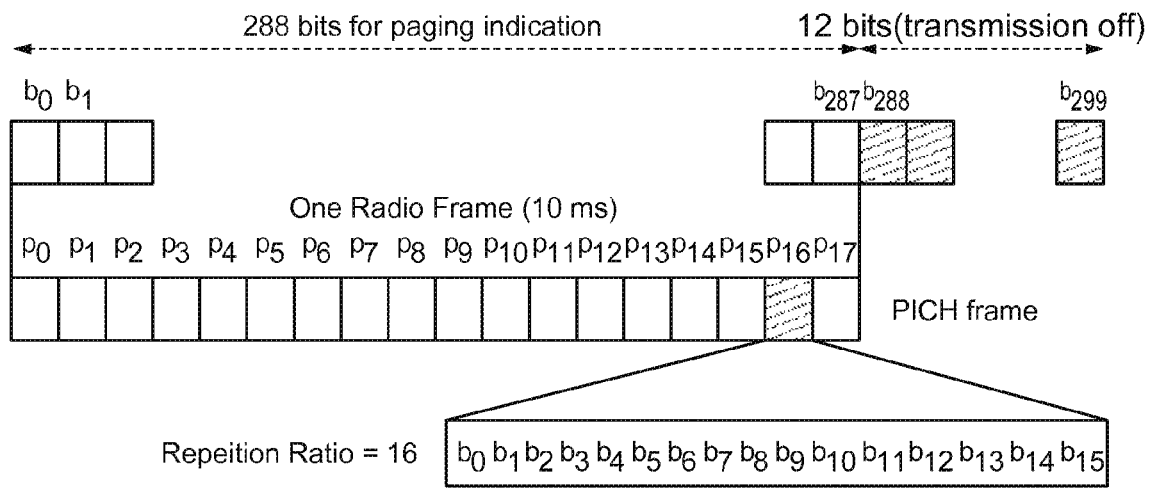
FIG. 6 is a diagram illustrating one embodiment of the structure of the paging indicator channel (PICH).

Referring to FIG. 6, one embodiment of the structure of the paging indicator channel is described in which $N_p$ is 18. Thus, each sub-frame is 288/18=16 bits long. For certain values of SFN and IMSI, q will be equal to 16. Accordingly, the UE will wake-up and read the PICH at a time corresponding to the sub-frame $P_{16}$, the seventeenth sub-frame out of eighteen sub-frames. In each PICH frame of 10 ms, 300 bits could be transmitted. In one embodiment, including the embodiment illustrated in FIG. 6, only 288 bits are used for sending paging indicators, while the remaining 12 bits are not transmitted. These bits may be used in other embodiments, such as later UMTS standards.

Figure 7:
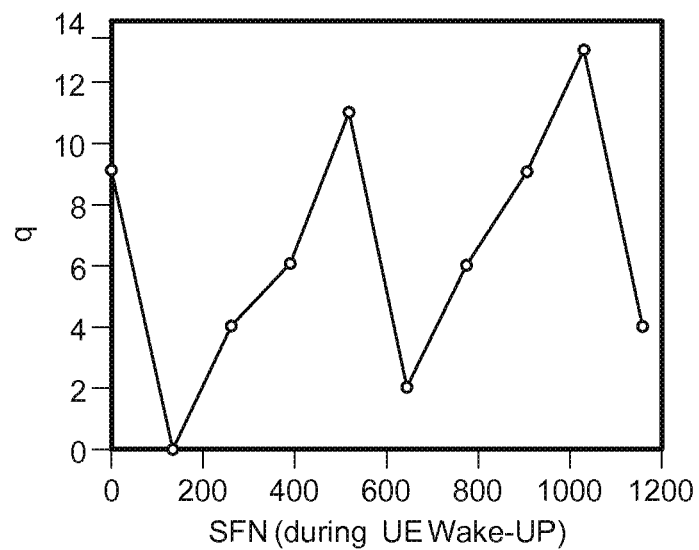
FIG. 7 is a plot of wake-up time (q) versus System Frame Number (SFN).

Referring to FIG. 7, a plot of wake-up time (q) versus cell identity (SFN) is shown in which the IMSI is set to 0 and $N_p$ is 18. The initial SFN value is chosen uniformly at between 0 and 4095. The x-axis depicts UE wake-up every 1.28 seconds (i.e. 128 SFNs) after the initial SFN value. From FIG. 7, it can be seen that q has a saw-tooth behavior but is also pseudo-random. The pattern does not appear to be deterministic over the SFNs from 0 to 4095.

Discussed below are beacon transmission methods based on three different assumptions regarding the knowledge at the HNB of the UE identity (IMSI) and macro NB identity (SFN). First, a method is described assuming that the SFN and IMSI are known at the HNB. Second, a method is described assuming that the SFN is known at the HNB, but that the IMSI is unknown. Third, a method is described assuming that the SFN and IMSI are both unknown at the HNB.

Figure 8:
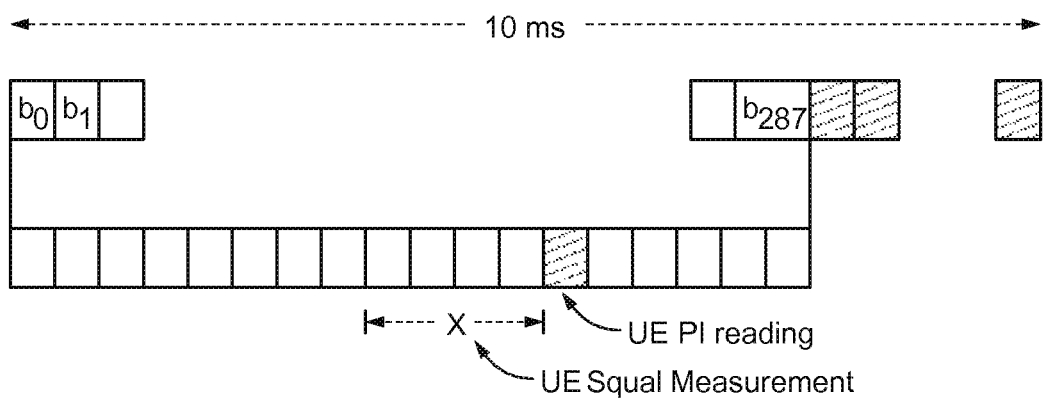
FIG. 8 is a diagram illustrating another embodiment of the structure of the paging indicator channel (PICH).

In one embodiment, the HNB has information regarding the IMSI of nearby UEs and information regarding the SFN (and frame boundary) of nearby macro NBs. As described above, in a UMTS cellular network, a UE wakes up every DRX cycle and measures the signal quality (Squal) of the serving macro NB. In one embodiment, the signal quality measurements of the serving NB are obtained before reading the PI on the PICH. In other embodiments, the signal quality measurements of the serving NB are obtained during or after reading the PI on the PICH. Referring to FIG. 8, another embodiment of the structure of the paging indicator channel is shown including a 10 ms frame, the time marked X, during which the UE measures the signal quality of the serving NB. Just after, in FIG. 8, the UE reads the PI on the PICH.

In one embodiment, the UE reads the PI from the serving NB at q_time equal to $q \times N_p \times 10/300$ ms, where q is between 0 and $N_p-1$ as shown in the equation above. The UE wakes up to measure the signal quality and reacquire the serving NB at (q_time−X) ms, and measures for X ms, where X is the expected time for reacquiring the serving NB.

In order for beacon transmission at the HNB to trigger a cell search at the UE, the measured signal quality of the serving cell must be less than a predefined threshold, and in order to trigger cell reselection at the UE, the measured signal quality of the serving cell must be less than a predefined threshold for a predefined amount of time. Mathematically, in order to trigger a cell search, Squal≤Sintersearch and in order to trigger a cell reselection, Squal≤Sintersearch for a duration of Treselection.

In one embodiment, to trigger cell searching at the UE, the HNB transmits a beacon coinciding with the time in which the UE performs signal quality measurement, the time marked X in FIG. 8, such that the measured signal quality (Squal) is lowered below a predetermined threshold (Sintersearch or Sintrasearch). As used herein, the term "beacon burst" is used to describe transmission of a beacon of length approximately equal to the expected time for a UE to reacquire the serving NB.

To trigger cell reselection at the UE, the measured signal quality must be below a predetermined threshold for a predetermined amount of time. Thus, in one embodiment, the HNB transmits a first beacon coinciding with a first time in which the UE performs signal quality measurement during a first DRX cycle and transmits a second beacon coinciding with a second time in which the UE performs signal quality measurement during a second DRX cycle.

Figure 9:
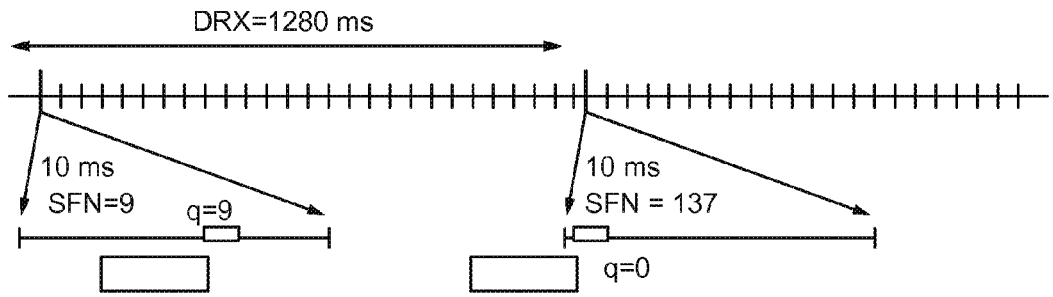
FIG. 9 is a diagram illustrating the transmission of multiple beacons during consecutive DRX cycles.

Referring to FIG. 9, multiple beacons can be transmitted during consecutive DRX cycles. In FIG. 9, the DRX cycle is 1.28 seconds and the UE wakes up at SFN 9 and 137 in the first and second DRX cycle, respectively. Assuming the predetermined time (Treselection) for which the measured signal quality (Squal) must be lower than a predetermined threshold (Sintersearch or Sintrasearch) in order to trigger cell reselection is equal to 1 second, the transmission of the first beacon during the first DRX cycle at SFN 9 triggers the UE to perform a cell search procedure and the transmission of the second beacon during the second DRX cycle at SFN 137 will cause Squal to be lower than Sintersearch or Sintrasearch for Treselection. Accordingly, the UE will perform a cell reselection procedure and will likely select the beacon-transmitting HNB.

Figure 10:
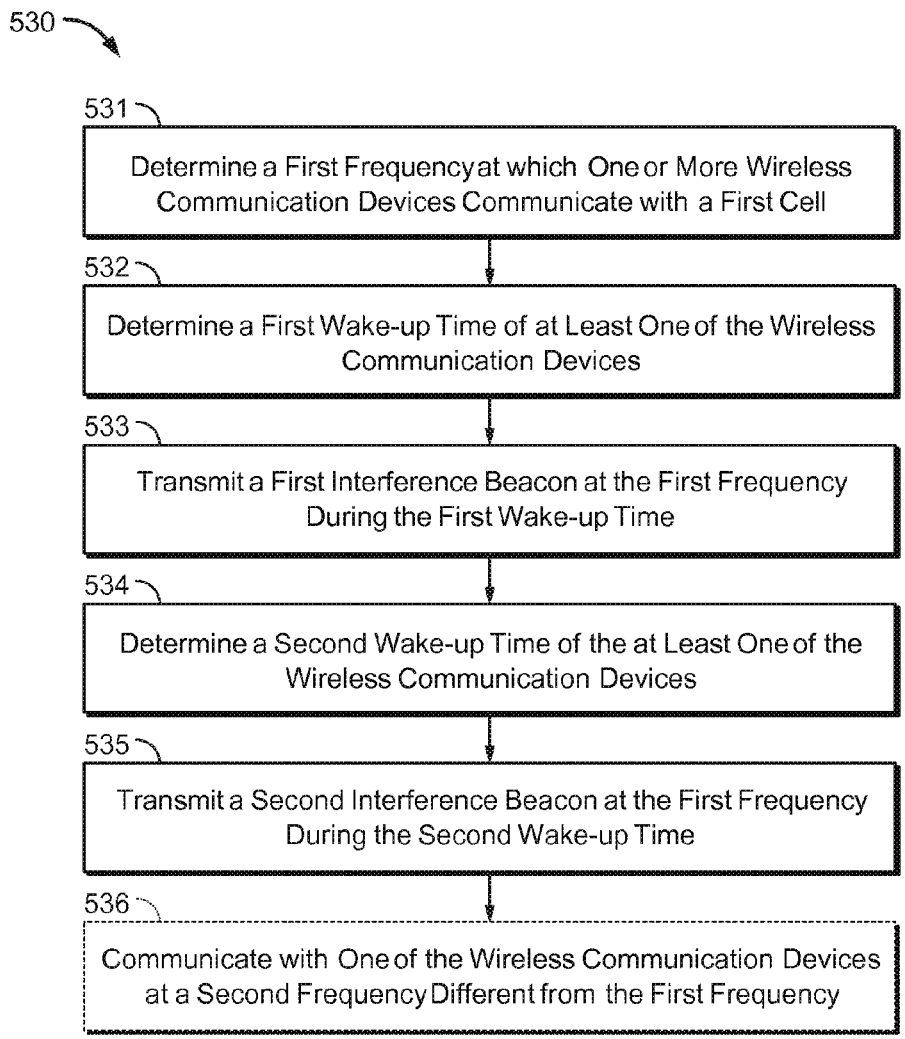
FIG. 10 is a flowchart illustrating another method of beacon transmission.

FIG. 9 illustrates the results of a method which is a particular example of more general method described with respect to FIG. 10, which illustrates a method 530 of transmitting interference beacons. The method 530 could be performed, for example, by the HNB 30 of FIG. 2. The method 530 begins, in block 531, with the determination of at least a first frequency at which one or more wireless communication devices communicate with a first cell. For example, in one embodiment, the HNB 30 of FIG. 2 determines the macro frequencies at which UEs are communicating with a macro NB. The determination may be performed, for example, by measuring the frequency of ongoing communications, such as when the UE reacquires the macro NB. The determination may also be performed by accessing one or more frequencies stored in a memory. Alternatively, the determination may be done passively.

Next, in block 532, a first wake-up time of at least one of the wireless communication devices is determined. In one embodiment, the first wake-up time is determined according the equations above in which IMSI and SFN are used to determine a wake-up time of the UE associated with the particular IMSI. In another embodiment, the first wake-up time is determined according to observation of the UE's pattern of wake-up times.

Once the first wake-up time is determined, the method 530 continues to block 533 in which an interference beacon is transmitted at the first frequency during the first wake-up time. In one embodiment, the interference beacon is transmitted such that the signal quality measured by the wireless communication device is less than a predetermined threshold. In one embodiment, the interference beacon is of a duration approximately equal to the expected time for the wireless communication device to reacquire the first cell.

In many cases, performance of the steps described with respect to block 531, 532, and 533 will trigger a wireless communication device to perform a cell search procedure.

Next, in block 534, a second wake-up time of the wireless communication device is determined. This determination can be performed as described above with respect to block 532. Although block 534 is described (and illustrated in FIG. 10) as after blocks 532 and 533, performance of the step associated with block 534 can be performed before block 532 or 533 or concurrently with block 532 or 533.

Once the second wake-up time is determined, the method 530 continues to block 535 in which a second interference beacon is transmitted at the first frequency during the second wake-up time. As mentioned above with respect to block 533, in one embodiment, the interference beacon is transmitted such that the signal quality measured by the wireless communication device is less than a predetermined threshold. In one embodiment, the interference beacon is of a duration approximately equal to the expected time for the wireless communication device to reacquire the first cell.

As mentioned above, in many cases, performance of the steps described with respect to block 531, 532, and 533 will trigger a wireless communication device to perform a cell search procedure. In many cases, performance of the steps described with respect to block 534 and 535 will trigger a wireless communication device to perform a cell reselection procedure. However, if the predetermined time for which the measured signal quality must be below the search threshold is long, transmission of more than two beacons may be required to trigger cell reselection. Although not shown in FIG. 10, the method 530 can be modified to include determination of a third (or fourth, etc.) wake-up time and transmission of a third (or fourth, etc.) interference beacon at the first frequency during the third (or fourth, etc.) wake-up time.

After a cell reselection procedure is performed, the process 530 concludes in block 536 with communication with the wireless communication device at a second frequency different from the first frequency.

In some embodiments, whereas the HNB has SFN timing of the macro NB, it will not have information of the SFN at which a UE will wake-up for Squal measurement, as the UE initial wake-up time can be random and unknown. In one embodiment, the HNB attempts to determine the SFN at which a UE will wake-up through observation of wake-up times. However, in another embodiment, the HNB transmits beacon bursts targeting multiple potential UE wake-up times as illustrated in FIG. 11.

If beacons are transmitted at all possible UE wake-up times, such transmission can trigger search and reselection for all UEs whose IMSI map to a particular PI Value. If there are more than one IMSIs associated with HNB, a HNB may transmit superimposed beacon patterns as described to cover the multiple IMSIs. Similarly, if there is more than one macro NB nearby, a HNB may transmit superimposed beacon patterns as described to cover multiple macro NB timings.

Figure 11:
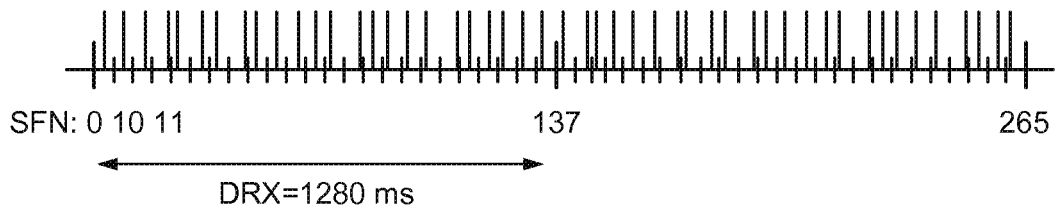
FIG. 11 is a diagram illustrating the transmission of multiple beacons at multiple potential UE wake-up times.
Figure 12:
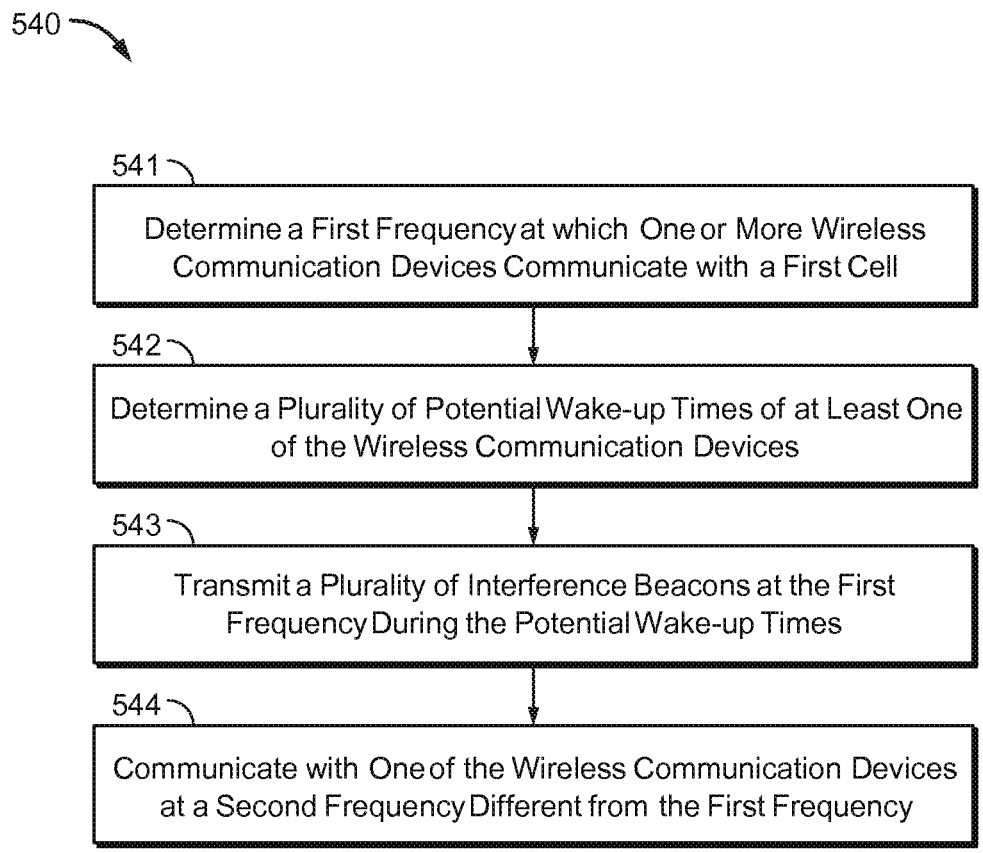
FIG. 12 is a flowchart illustrating yet another beacon transmission.

FIG. 11 illustrates the results of a method which is a particular example of more general method described with respect to FIG. 12, which illustrates another method of transmitting interference beacons. The method 540 could be performed, for example, by the HNB 30 of FIG. 2. The method 540 begins, in block 541, with the determination of at least a first frequency at which one or more wireless communication devices communicate with a first cell. For example, in one embodiment, the HNB 30 of FIG. 2 determines the macro frequencies at which UEs are communicating with a macro NB. The determination may be performed, for example, by measuring the frequency of ongoing communications, such as when the UE reacquires the macro NB. The determination may also be performed by accessing one or more frequencies stored in a memory. Alternatively, the determination can be performed passively.

Next, in block 542, a plurality of potential wake-up times of at least one of the wireless communication devices is determined. In one embodiment, the potential wake-up times are determined according the equations above in which the known SFN is used to determine potential wake-up times of the UE. In another embodiment, the potential wake-up times are determined according to observation of the UE's pattern of wake-up times prior to beginning the method 540.

Once the plurality of potential wake-up times are determined, the method 540 continues to block 543 in which a plurality of interference beacons are transmitted at the first frequency during the potential wake-up times. In one embodiment, the interference beacons are transmitted such that the signal quality measured by the wireless communication device is less than a predetermined threshold. In one embodiment, the interference beacons are of a duration approximately equal to the expected time for the wireless communication device to reacquire the first cell. It is not necessary that an interference beacon be transmitted at each of the plurality of determined potential wake-up times.

In many cases, performance of the steps described with respect to block 541, 542, and 543 will trigger a wireless communication device to perform a cell search procedure. Further, if the transmission in block 543 continues long enough, such transmission will trigger a wireless communication device to perform a cell reselection procedure as well. In particular, cell reselection will be performed if transmission is such that the measured signal quality (Squal) at the UE is less than a predetermined threshold (Sintersearch or Sintrasearch) for a predetermined amount of time (Treselection).

After a cell reselection procedure is performed, the process 540 concludes in block 544 with communication with the wireless communication device at a second frequency different from the first frequency.

Using a method similar to that illustrated in FIGS. 11 and 12, the average delay for reselection of a targeted UE is Treselection×DRX_cycle×nMacroNB×nIMSI, where DRX_cycle is the DRX cycle length, nMacroNB is the number of targeted macro NBs and nIMSI is the number of targeted UEs. For example, if only one macro NB and one UE are targeted, Treselection is 1 second, and the DRX cycle is 1.28 seconds, the average delay for reselection is 1.28 seconds. The worst case delay for reselection of a targeted UE is twice the average delay. Thus, for the example stated above, the worse case delay would be 2.56 seconds.

As an alternative to transmission as shown in FIG. 11 above, the HNB may time stagger the beacon transmission such that the HNB transmits a beacon of a duration of X ms every n frames, where n is 1, 2, 3, . . . 127 to cover all possible UE wake-up SFNs.

Described above is an embodiment in which the HNB has information regarding the IMSI of nearby UEs and information regarding the SFN (and frame boundary) of nearby macro NBs. In another embodiment, the HNB has information regarding the SFN (and frame boundary) of nearby NBs, but does not having information regarding the IMSI of nearby UEs. The method described above with respect to the case in which the HNB has IMSI information can be applied with modification.

From the equations shown above, and reproduced below, it is evident that in the calculation of q, IMSI adds an additional offset constant. This constant offset will not exceed $N_p-1$ due to the modulo $N_p$ operation.

$$PI\ Value = (IMSI\ div\ 8192) \bmod N_p;\ and$$

$$q = \left(PI\ Value + \left[\left(\left(18 \times \left(\begin{array}{c} SFN + \lfloor SFN/8 \rfloor + \\ SFN/64 \rfloor + \lfloor SFN/512 \rfloor \end{array}\right)\right) \bmod 144\right) \times \frac{N_p}{144}\right]\right)$$

$$\bmod N_p$$

The method described above with respect to the case in which the HNB has IMSI information can be applied by varying PI Value from 0 to $N_p-1$. Because the IMSIs of UEs are unknown, the beacon transmission patterns described above will have to cycle through, at most, $N_p$ times. This method provides the lowest worst case delay for HNB discovery time.

Figure 13:
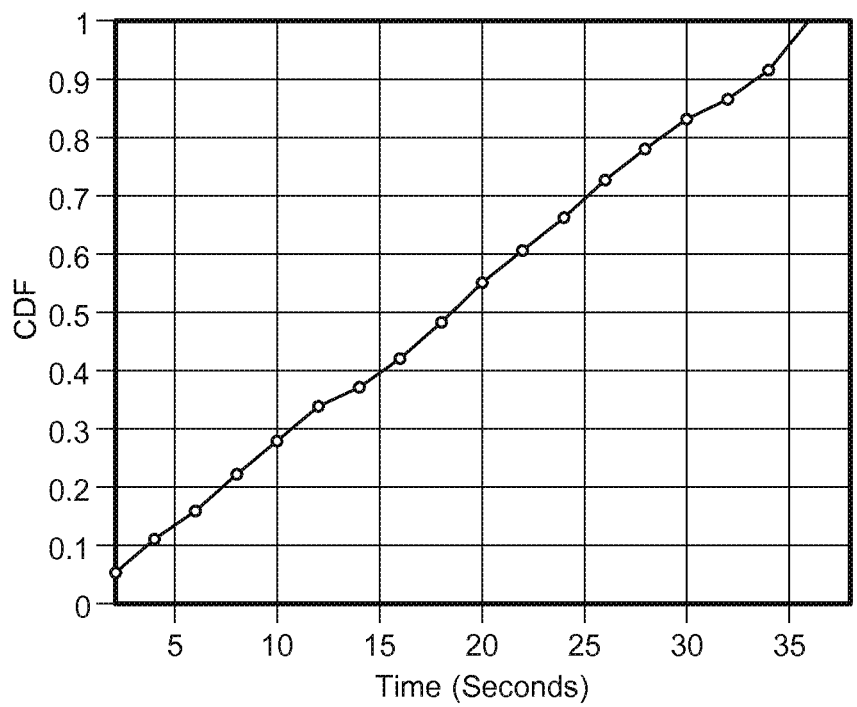
FIG. 13 is a graph of the cumulative density function (CDF) of HNB discovery time.

Referring to FIG. 13, the cumulative density function (CDF) of HNB discovery was simulated for the case in which $N_p$ is 18, Treselection is 1 ms, DRX_cycle is 1.28 ms, and nMacroNB is one. The PI Value approximates a uniform random variable between 0 and $N_p-1$. Because the beacon transmission pattern has to cycle through, at most, $N_p$ different configurations, the HNB discovery time approximates a uniform random variable between 2×DRX_cyle seconds and 2×$N_p$×DRX_cycle second.

The method 540 illustrated by the flowchart in FIG. 12 can also be applied to the case in which the HNB does not have IMSI information regarding nearby UEs. The plurality of potential wake-up times determined in block 542 can be determined, in one embodiment, by cycling through the $N_p$ different offset values in determining q.

In another embodiment, the HNB does not have SFN or IMSI information. As described above, in a UMTS cellular network, a UE wakes up every DRX cycle and measures the signal quality (Squal) of the serving macro NB. In one embodiment, the signal quality measurements of the serving NB are obtained before reading the PI on the PICH as shown in FIG. 8.

In order for beacon transmission at the HNB to trigger a cell search at the UE, the measured signal quality of the serving cell must be less than a predefined threshold, and in order to trigger cell reselection at the UE, the measured signal quality of the serving cell must be less than a predefined threshold for a predefined amount of time. Mathematically, in order to trigger a cell search, Squal≤Sintersearch and in order to trigger a cell reselection, Squal≤Sintersearch for a duration of Treselection. As noted above, this may require more than one interference beacon to be transmitted in more than one DRX cycle, as shown in FIG. 9.

In one embodiment, the UE reads the paging indicators (PI) from the serving NB during a first DRX cycle at q_time1 equal to $q1 \times N_p \times 10/300$ ms, where q1 is between 0 and $N_p-1$ as calculated in the equation for q above. Further, the UE reads the PI from the serving NB during a second DRX cycle at q_time2 equal to $q2 \times N_p \times 10/300$ ms, where q2 is between 0 and $N_p-1$ as calculated in the equation for q above. The different between these two times is q_diff. Mathematically, q_diff=q_time2−q_time1.

Knowledge of the probability mass function (or other characteristics) of q_diff can be used in designing a beacon transmission pattern. For example, information regarding q_diff may be used to transmit beacons at determined UE wake-up times for a second DRX cycle based on a wake-up time determined for a first DRX cycle.

Figure 14:
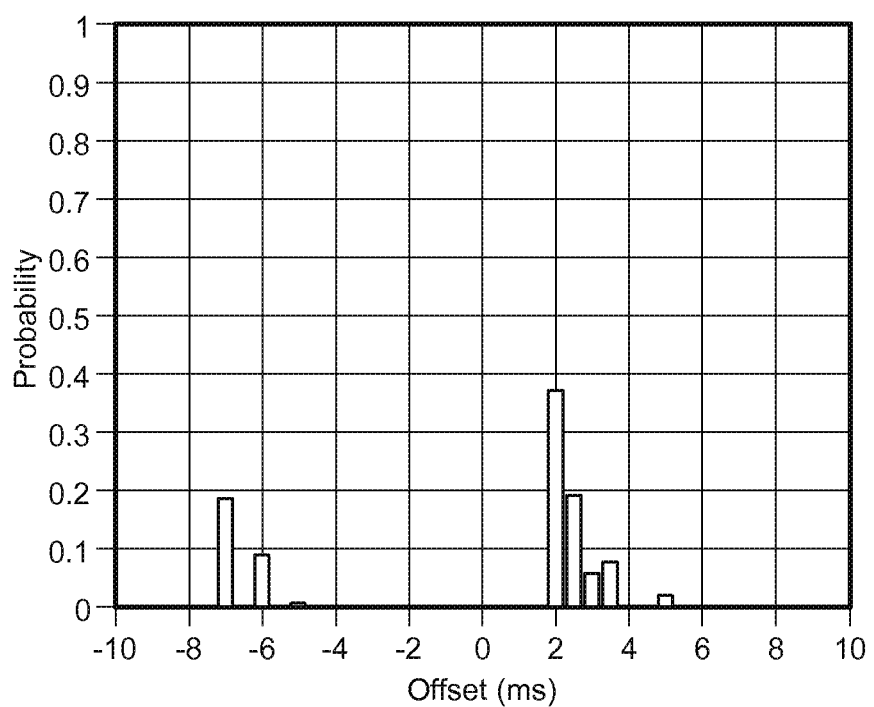
FIG. 14 is a graph of the estimated probability mass function of the difference in UE wake-up times.

Referring to FIG. 14, the estimated probability mass function of the difference in UE wake-up times is described. As noted above, q depends on IMSI, SFN, and $N_p$. The graph of the probability mass function of FIG. 14 was generated by setting $N_p$ to a constant value of 18, and varying IMSI and SFN. From FIG. 14, a few observations can be made. As can be seen, q_diff does not approximate a uniform random variable. In fact, q_diff only takes a few values between −10 ms and 10 ms. The probability of q_diff taking the value of 2.133 ms is higher than others and equal to approximately 0.3718. The probability of q_diff taking a value between 2 and 4 ms is approximately 0.6987.

Multidimensional probability mass functions can be generated based on more than one prior wake-up time. For example, q_diff2($a,b$) can be defined, wherein a=q_time3−q_time2, b=q_time2−q_time1, and q_time3 is calculated as q_time2 and q_time1 above. The probability mass function of q_diff2 can also be used to determine potential UE wake-up times.

In one embodiment, the beacon transmission pattern is based on the estimated probability mass function of the difference in UE wake-up times.

Figure 15:
FIG. 15 is a diagram of a beacon transmission pattern having 2 ms ON periods and 8 ms OFF periods.
Figure 16:
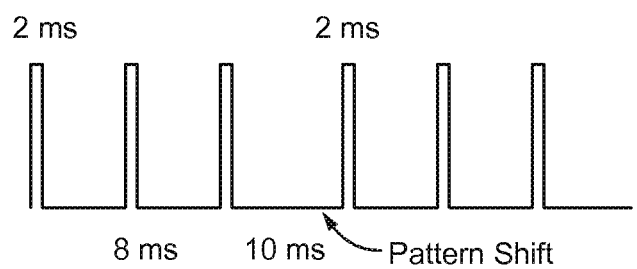
FIG. 16 is a diagram of a beacon transmission pattern including a pattern shift of 2 ms.

Examples of beacon transmission based on the probability mass function of q_diff are illustrated in FIGS. 15-18. Referring to FIG. 15, one embodiment of a beacon transmission pattern has 2 ms ON periods and 8 ms OFF periods. Referring to FIG. 16, another embodiment of a beacon transmission pattern includes a pattern shift of 2 ms. A pattern shift based on the probability mass function (PMF) of q_diff can be applied after a DRX cycle (or after multiple DRX cycles or each DRX cycle). The pattern shift may be time-varying. FIG. 16 illustrates a pattern shift of 2 ms, in that there is an OFF period of 10 ms between two DRX cycles rather than 8 ms as in FIG. 15.

Figure 17:
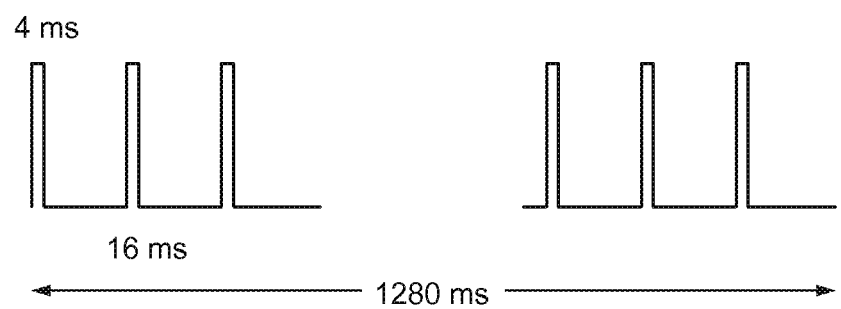
FIG. 17 is a diagram of a beacon transmission pattern having 4 ms ON periods and 16 ms OFF periods.
Figure 18:
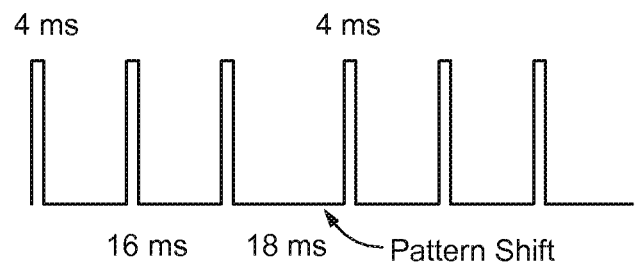
FIG. 18 is another diagram of a beacon transmission pattern including a pattern shift of 2 ms.

Referring to FIG. 17, another embodiment of a beacon transmission pattern has 4 ms ON periods and 16 ms OFF periods. Referring to FIG. 18, another embodiment of a beacon transmission pattern includes a pattern shift of 2 ms. A pattern shift based on the probability mass function (PMF) of q_diff can be applied after a DRX cycle (or after multiple DRX cycles or each DRX cycle). The pattern shift may be time-varying. FIG. 18 illustrates a pattern shift of 2 ms, in that there is an OFF period of 18 ms between two DRX cycles rather than 16 ms as in FIG. 17. It is to be appreciated that the beacon transmission patterns of FIGS. 15-18 are examples only. The beacon patterns may take different ON and OFF durations. Also, the pattern shift may be deterministic or random.

As mentioned above, interference with nearby non-allowed UEs is undesirable. A UE in an active call via the macro NB may be negatively impacted by beacon transmissions. For example, UE CQI (Channel Quality Indicator) measurement may be affected. In a UMTS cellular network, the UE measures the downlink channel quality and sends a CQI report on the HS-DPCCH (High Speed Dedicated Physical Control Channel) to the macro NB, which the macro NB uses to schedule packet transmission. If a beacon is transmitted by the HNB during CQI measurement, this can result in lower packet sizes or less packet transmissions allocated to the UE, thereby reducing data throughput. As another example, data packets on the HS-DSCH (High Speed-Downlink Shared Channel) can also be affected. In a UMTS cellular network, one or more of the HS-PDSCH (Physical Downlink Shared Channel) carry data to the UE. Beacon transmission may affect a certain number of these channels and across certain TTIs (Transmission Time Intervals).

These effects may be at least partially mitigated if the HNB employs mobile sensing to sense the UE uplink for estimating the location and duration of CQI feedback and, based on this information, transmits beacon patterns which avoid the UE CQI measurement period. Further, the HNB can adopt any of a number of other interference-mitigation actions. For example, upon detecting a registration attempt for a non-allowed UE, the HNB can modify its beacon transmission pattern to mitigate any interference that it may cause to non-allowed UE by turning off the beacon on that macro frequency, decreasing the power of the beacon, or transmitting the beacon less frequently or with varying power.

If the beacon on a particular macro frequency is turned off to avoid interfering with a non-allowed UE, beacon transmission on that particular macro frequency may be resumed after a predetermined amount of time. Alternatively, restoration can be achieved by ramping up the beacon power over time.

Mobile sensing on the UL (uplink) can be used to detect the presence of a user near the HNB. When a user is present near the HNB, the HNB can apply one or more of the interference management methods described above. Further, the HNB transmit power may be changed depending on the beacon transmission pattern. This may be done to accommodate power limitations, if any.

Figure 19:
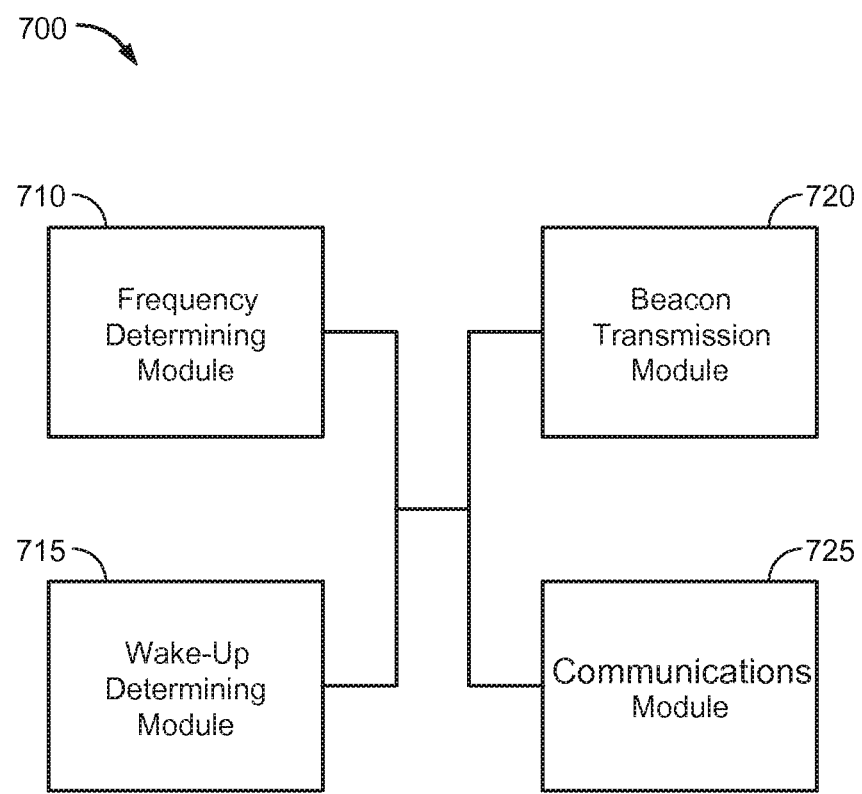
FIG. 19 is a simplified block diagram of a sample aspect of an apparatus configured to provide beacon transmission operations as taught herein.

The functionality described herein (e.g., with regard to one or more of the accompanying figures) may correspond in some aspects to similarly designated "means for" functionality in the appended claims. Referring to FIG. 19, apparatus 700 is represented as a series of interrelated functional modules. With respect to FIG. 19, a frequency determining module 710 may correspond at least in some aspects to, for example, a processor, a memory, or a transceiver as discussed herein. The frequency determining module 710 may determine at least a first frequency at which one or more wireless communication devices communicate with a first cell. The frequency determining module 710 may determine multiple frequencies at which one or more wireless communication devices communicate with a first cell. A wake-up determining module 715 may correspond at least in some aspects to, for example, a processor, a memory, or a transceiver as discussed herein. The wake-up determining module 715 may determine a first wake-up time of the at least one of the wireless communication devices. The wake-up determining module 715 may also determine a second wake-up time of the at least one of the wireless communication devices. The wake-up determining module 715 may determine a plurality of potential wake-up times of the at least one of the wireless communication devices. A beacon transmission module 720 may correspond at least in some aspects to, for example, a processor, a network interface, an air interface, a transmitter, a transceiver, or one or more antennas as discussed herein. The beacon transmission module 720 may transmit an interference beacon at the first frequency configured to at least partially interfere with communications at the first frequency and initiate a cell reselection process by at least one of the wireless communication devices. A communications module 725 may correspond at least in some aspects to, for example, a processor, a network interface, an air interface, a transceiver, a transmitter, a receiver, or one or more antennas as discussed herein. The communications module 725 may communicate with the at least one of the wireless communication device at a second frequency different from the first frequency.

The functionality of the modules of FIG. 19 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects, one or more of any dashed blocks in FIG. 19 or other Figures are optional.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer readable medium. Computer readable media includes both computer storage media and communication media including any medium that facilitates transfer of a computer program from one place to another. A storage media may be any available media that can be accessed by a computer. By way of example, and not limitation, such computer readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of initiating cell reselection in a wireless communication device, the method comprising:
   determining a first frequency at which one or more wireless communication devices communicate with a first cell;
   determining a plurality of potential wake-up times of at least one of the wireless communication devices based on a probability density function comprising a random start time and time offsets; and
   transmitting an interference beacon during one of the plurality of potential wake-up times at the first frequency configured to at least partially interfere with communications at the first frequency, wherein the transmitting the interference beacon initiates a cell reselection process by the at least one of the wireless communication devices.

2. The method of claim 1, further comprising communicating with the at least one of the wireless communication devices at a second frequency different from the first frequency.

3. The method of claim 1, wherein the beacon comprises one or more overhead channels.

4. The method of claim 3, wherein the beacon comprises one or more of a P-SCH (Primary Synchronization Channel), S-SCH (Secondary Synchronization Channel), PCCPCH (Primary Common Control Physical Channel), BCCH (Broadcast Control Channel), PICH (Paging Indicator Channel), PCH (Paging Control Channel), and PC-PICH (Primary Common Pilot Channel.

5. The method of claim 1, wherein the beacon comprises cell data regarding a second cell different from the first cell.

6. The method of claim 5, wherein the cell data indicates a cell access restriction status is set to one of cell barred, reserved, or reserved for future-user status.

7. The method of claim 5, wherein the cell data indicates a cell reserved for CSG (Closed Subscriber Group) is set to true.

8. The method of claim 7, wherein the cell data indicates an LAI (Location Area Identifier) of the beacon which is an LAI of the first cell.

9. The method of claim 8, wherein the LAI of the first cell is different from an LAI of the second cell.

10. The method of claim 1, further comprising determining a first wake-up time of the plurality of potential wake-up times of the at least one of the wireless communication devices, wherein the beacon is transmitted during the determined first wake-up time.

11. The method of claim 10, further comprising determining a second wake-up time of the plurality of potential wake-up times of the at least one of the wireless communication devices and transmitting another interference beacon at the first frequency during the determined second wake-up time.

12. The method of claim 10, wherein the first wake-up time is determined based at least in part on a SFN (System Frame Number) of the first cell and an IMSI (International Mobile Subscriber Identity) of the at least one of the wireless communication devices.

13. The method of claim 1, further comprising:
transmitting a plurality of additional interference beacons at the first frequency during other determined potential wake-up times.

14. The method of claim 13, wherein the potential wake-up times are determined based at least in part on a SFN (System Frame Number) of the first cell.

15. The method of claim 1, further comprising transmitting a plurality of interference beacons at the first frequency.

16. The method of claim 1, further comprising periodically transmitting interference beacons at the first frequency.

17. An apparatus for initiating cell reselection in a wireless communication device, the apparatus comprising:
a processor configured to:
determine a first frequency at which one or more wireless communication devices communicate with a first cell;
determine a plurality of potential wake-up times of at least one of the wireless communication devices based on probability density function comprising a random start time and time offsets; and
a transceiver configured to transmit an interference beacon during one of the plurality of potential wake-up times at the first frequency configured to at least partially interfere with communications at the first frequency, wherein the transmission initiates a cell reselection process by the at least one of the wireless communication devices.

18. The apparatus of claim 17, wherein the transceiver is further configured to communicate with the at least one of the wireless communication devices at a second frequency different from the first frequency.

19. The apparatus of claim 17, wherein the beacon comprises one or more of a P-SCH (Primary Synchronization Channel), S-SCH (Secondary Synchronization Channel), PCCPCH (Primary Common Control Physical Channel), BCCH (Broadcast Control Channel), PICH (Paging Indicator Channel), PCH (Paging Control Channel), and PC-PICH (Primary Common Pilot Channel).

20. The apparatus of claim 17, wherein the processor is further configured to determine a first wake-up time of the plurality of potential wake-up times of the at least one of the wireless communication devices and the transceiver is configured to transmit the beacon during the determined first wake-up time.

21. The apparatus of claim 20, wherein the first wake-up time is determined based at least in part on a SFN (System Frame Number) of the first cell and an IMSI (International Mobile Subscriber Identity) of the at least one of the wireless communication devices.

22. The apparatus of claim 17, wherein the transceiver is further configured to transmit a plurality of additional interference beacons at the first frequency during other determined potential wake-up times.

23. The apparatus of claim 22, wherein the potential wake-up times are determined based at least in part on a SFN (System Frame Number) of the first cell.

24. A computer program product comprising:
a non-transitory computer readable medium further comprising:
code for causing a computer to determine a first frequency at which one or more wireless communication devices communicate with a first cell;
code for causing the computer to determine a plurality of potential wake-up time of at least one of the wireless communication devices based on a probability density function comprising a random start time and time offsets; and
code for causing the computer to transmit an interference beacon during one of the plurality of potential wake-up times at the first frequency configured to at least partially interfere with communications at the first frequency, wherein the transmitting the interference beacon initiates a cell reselection process by the at least one of the wireless communication devices.

25. The computer program product of claim 24, further comprising code for causing the computer to communicate with the at least one of the wireless communication devices at a second frequency different from the first frequency.

26. The computer program product of claim 24, further comprising code for causing the computer to determine a first wake-up time of the plurality of potential wake-up times of the at least one of the wireless communication devices and transmitting the beacon during the determined first wake-up time.

27. The computer program product of claim 26, wherein the first wake-up time is determined based at least in part on a SFN (System Frame Number) of the first cell and an IMSI (International Mobile Subscriber Identity) of the at least one of the wireless communication devices.

28. The computer program product of claim 24, further comprising:
code for causing the computer to transmit a plurality of additional interference beacons at the first frequency during other determined potential wake-up times.

29. The computer program product of claim 28, wherein the potential wale-up times are determined based at least in part on a SFN (System Frame Number) of the first cell.

30. An apparatus for initiating cell reselection in a wireless communication device, the apparatus comprising:
- means for determining a first frequency at which one or more wireless communication devices communicate with a first cell;
- means for determining a plurality of potential wake-up times of at least one of the wireless communication devices based on a probability density function comprising a random start time and time offsets; and
- means for transmitting an interference beacon during one of the plurality of potential wake-up times at the first frequency configured to at least partially interfere with communications at the first frequency, wherein the means for transmitting the interference beacon initiates a cell reselection process by the at least one of the wireless communication devices.

31. The apparatus of claim 30, further comprising means for communicating with the at least one of the wireless communication devices at a second frequency different from the first frequency.

32. The apparatus of claim 30, further comprising means for determining a first wake-up time of the plurality of potential wake-up times of the at least one of the wireless communication devices, wherein the beacon is transmitted during the determined first wake-up time.

33. The apparatus of claim 30, wherein a plurality of additional interference beacons are transmitted at the first frequency during other determined potential wake-up times.

* * * * *